United States Patent [19]

Roberts

[11] Patent Number: 4,477,804
[45] Date of Patent: Oct. 16, 1984

[54] ELECTRICAL CIRCUIT FOR PROVIDING AN ABNORMAL TRANSIENT DISPLAY SYSTEM FOR NUCLEAR REACTOR OPERATION

[75] Inventor: Robert C. Roberts, Lynchburg, Va.

[73] Assignee: The Babcock & Wilcox Company, New Orleans, La.

[21] Appl. No.: 353,751

[22] Filed: Mar. 1, 1982

[51] Int. Cl.³ ............................................. G07G 1/02
[52] U.S. Cl. ................................... 340/747; 340/744; 340/814
[58] Field of Search ............... 340/721, 722, 799, 747, 340/814, 744; 364/492, 494, 495, 504, 415; 376/259, 277; 358/183

[56] References Cited

U.S. PATENT DOCUMENTS

| | | | |
|---|---|---|---|
| 3,811,040 | 5/1974 | Weinfurt et al. | 340/721 |
| 4,060,716 | 11/1977 | Pekrul et al. | 376/259 |
| 4,257,043 | 3/1981 | Tsuchiko | 340/722 |
| 4,292,129 | 9/1981 | Barry | 364/504 |
| 4,317,114 | 2/1982 | Walker | 340/747 |
| 4,328,491 | 5/1982 | Demetrescu et al. | 340/747 |
| 4,345,246 | 8/1982 | van den Driessche | 340/814 |

*Primary Examiner*—Gerald L. Brigance
*Attorney, Agent, or Firm*—Vytas R. Matas; Robert J. Edwards

[57] ABSTRACT

A system for monitoring a limited number of operating conditions in a nuclear reactor and for graphically displaying same on a display device is disclosed. The system parameters selected are those which typically change as a result of a reactor trip. As long as these system parameters remain within a "post-trip window" on the graphic display, the power plant is operating normally. If, however, any of the foregoing system parameters falls outside this "window", this is an immediate indication to the power plant operator to institute the necessary procedures to remedy same. A sequential controller (26) is provided to continuously sequentially sample the foregoing operating parameters and to transmit data regarding same to the display device.

3 Claims, 10 Drawing Figures

ELECTRICAL CIRCUIT FOR PROVIDING AN ABNORMAL TRANSIENT DISPLAY SYSTEM FOR NUCLEAR REACTOR OPERATION

TECHNICAL FIELD

This invention generally relates to a system for identifying abnormal operating conditions in a nuclear power plant, and more particularly to a system for monitoring a limited number of specific operating conditions which are common to a large number of initiating events which cause reactor trip.

BACKGROUND ART

The traditional approach to accident control in a nuclear power plant has been to develop many "emergency" procedures, each based on a postulated event, such as loss of main feedwater. The power plant operator was required to study this event and memorize its symptoms and the action required to remedy same. If a loss of feedwater occurred, the operator was expected to recognize this condition, perform the appropriate immediate actions, and then use the event-oriented loss-of-feedwater procedure for determining follow-up actions. The foregoing procedure has several inherent disadvantages:

1. The power plant operator must promptly and correctly diagnose the initiating event. He accomplishes this mentally, based on training and prior experience. As a result of this instant evaluation, he then selects the event-oriented procedure that best fits his diagnosis. For example, if his evaluation indicates that a small steam line break has occurred in the reactor building when, in actuality, a small loss of coolant has occurred in the building, he would implement the wrong event-oriented procedure. Eventually he will recognize his error, however, by that time, the condition may have substantially worsened.

2. Procedures must be written to cover every conceivable initiating event. If the power plant operator correctly diagnoses an initiating event and no procedure has been developed to cover that event, his actions will be based on his level of experience.

3. If more than one event contributes to the transient, the operator will find that he has to work on two or more procedures simultaneously. These procedures may conflict and the operator must establish a priority with respect thereto. It is possible to write a procedure combining two events, however, if more failures are considered, the number of failure combinations, along with their initiating events, becomes extremely large. Even if such procedures could be established, the large number of procedures would definitely have an adverse effect on the operator's ability to select the proper procedure.

4. Because of the foregoing limitations, most operators are likely to use no specific procedure. Instead, they will use training, experience, intuition, etc. to bring the plant under control. They will then select what they believe is the proper procedure to remedy the condition and will later review the results to determine if their procedure selection was appropriate.

Because of the disadvantages associated with an event-oriented approach to determining and correcting malfunctions in a nuclear reactor installation, it has become desirable to formulate and develop a new approach for promptly identifying and correcting malfunctions in such a system.

SUMMARY OF THE INVENTION

The present invention solves the aforementioned problems associated with the prior art as well as other problems by employing a symptom-oriented approach, rather than an event-oriented approach, for identifying and correcting system malfunctions. The symptoms that have been determined to be of primary importance are inadequate primary inventory subcooling, inadequate primary-to-secondary heat transfer, and excessive primary to secondary heat transfer. The information required to monitor these symptoms include the reactor coolant system hot leg temperature ($T_{HOT}$) and cold leg temperature ($T_{COLD}$), steam generator pressure and the saturation temperature associated therewith, and the reactor coolant pressure. In the invention of this disclosure, measurements of the foregoing parameters are displayed in the form of dynamic data on a static pressure-temperature (P-T) graph having a "post-trip window". As long as the reactor coolant system hot leg temperature ($T_{HOT}$, cold leg temperature ($T_{COLD}$) and the saturation temperature of the secondary side of the steam generator (SG $T_{SAT}$) remain within this window, the plant is responding normally. If, however, any of the foregoing parameters move outside this window as a result of a reactor trip, the power plant operator immediately selects and implements the proper procedure, which has been established, to correct the condition(s) and bring the power plant back into normal operating range. A sequential controller is provided to continuously monitor the foregoing parameters so that any transients are promptly displayed on the pressure-temperature graph. In this manner, transients can be immediately detected and corrective procedures can be promptly taken.

DESCRIPTION OF THE PREFERRED EMBODIMENT

The invention of this disclosure is based upon the principal of symptom-oriented, as opposed to event-oriented, procedures with respect to post reactor trip control. The symptoms are based on upsets in the heat transfer from the reactor core to the coolant and from the coolant to the steam generators. Thus, in essence, these symptom-oriented procedures focus primarily on core cooling and secondarily on event identification.

The three symptoms that have been determined to be of primary interest to the power plant operator are adequate subcooling of the primary system inventory, inadequate primary-to-secondary heat transfer, and excessive primary-to-secondary heat transfer. These symptoms are important for the following reasons:

1. Inadequate primary inventory subcooling. If the power plant operator knows that the primary fluid is in a liquid state, he is assured that it is available and capable of removing heat from the reactor core and transferring it to the steam generators. If subcooling is lost, the foregoing is in doubt, and the operator must make every effort to regain subcooling.

2. Inadequate primary-to-secondary heat transfer. This symptom addresses the heat transfer coupling across the steam generators and describes the ability of the system to keep the flow of energy moving from the reactor coolant system to the ultimate heat sink. In order to determine the adequacy of this heat transfer, the power plant operator monitors the relationship between the reactor coolant cold leg temperature and the steam generator secondary side saturation temperature. Following a reactor trip, these two values should be nearly equal under good heat transfer conditions.

3. Excessive primary-to-secondary heat transfer. In this case, this symptom is indicative of a secondary side malfunction (e.g., loss of steam pressure control or steam generator overfill). When this occurs, the heat transfer is again unbalanced and the operator's attention is directed toward taking measures to correct this imbalance.

By monitoring the foregoing symptoms or conditions, the power plant operator can readily recognize and define the problem without having to check a larger number of operating parameters. At the same time, because of their nature these symptoms permit a rapid elimination of problem sources while maintaining emphasis on reactor core protection. Additionally, inasmuch as the foregoing symptoms are so basic, the corrective procedures cover a vast number of possible initiating events. Thus, as the operator proceeds to treat the symptom he will most likely identify and correct the cause.

The information required to monitor these symptoms is usually available in power plant control rooms and consists of reactor coolant system hot and cold leg temperatures, reactor coolant system pressure, steam generator pressure, and access to steam tables. The problem is how these variables can be best displayed to give the power plant operator a simple and logical method for monitoring the foregoing symptoms. The solution, which is the essence of this invention, is basically a pressure-temperature (P-T) display with a saturation curve included, as shown in FIGS. 1 through 9. It should be noted that these Figures, along with the other drawings and/or schematics included herein, are intended for describing the preferred embodiment of the present invention and are not intended to limit the invention hereto. In these Figures, the area above and to the left of the saturation curve is the subcooled region. The area below and to the right is the superheat region. The reactor coolant system hot leg temperature ($T_{HOT}$) and the cold leg temperature ($T_{COLD}$) are inputs to this display and are plotted as function of the reactor coolant system pressure. Steam generator pressure is also an input and the saturation temperature for this input is displayed as a vertical line. The subcooled margin line accounts for potential instrumentation inaccuracies with the objective of assuring subcooling above that line.

Figure 1:
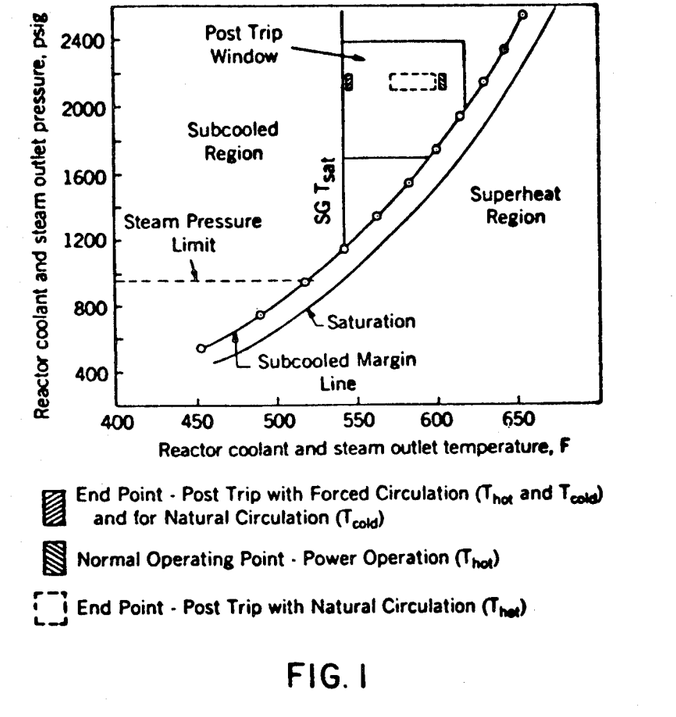
FIG. 1 illustrates the basic pressure-temperature (P-T) display.
Figure 2:
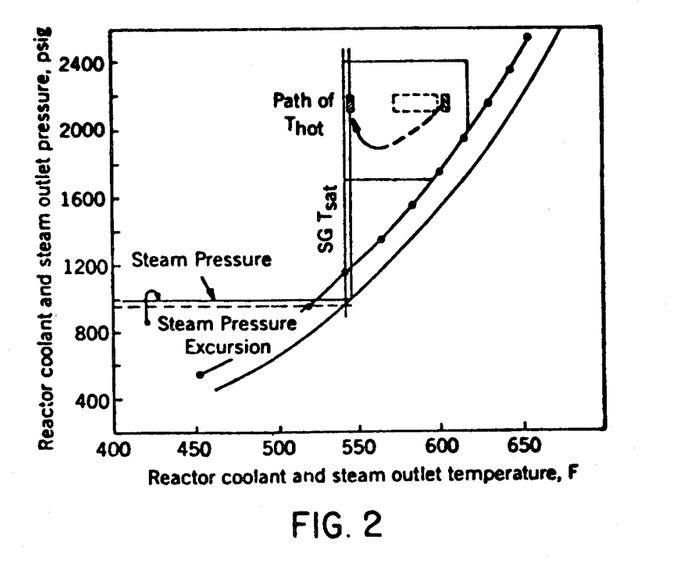
FIG. 2 illustrates a typical post-trip response on the display.

The above pressure-temperature display is shown in FIG. 1 and a typical response to a reactor trip is illustrated in FIG. 2 wherein, to retain simplicity, only the reactor coolant hot leg temperature is plotted. With the reactor coolant pumps operating, i.e., forced circulation, and a comparatively small amount of heat being added to the coolant by decay heat, the cold leg temperature typically approaches the hot leg temperature. In addition, inasmuch as the $\Delta T$ across the steam generator tubes is small, both of the foregoing temperatures approach the saturation temperature of the secondary side of the steam generator (SG $T_{SAT}$). FIG. 2 also shows the steam pressure moving from its pre-trip value up to the steam safety valve setpoint and back to its post-trip value. As long as $T_{HOT}$, $T_{COLD}$ and SG $T_{SAT}$ remain within the "post-trip window", the plant is responding normally. Thus, with this type of display, the symptoms of interest are highlighted for the power plant operator.

Figure 3:
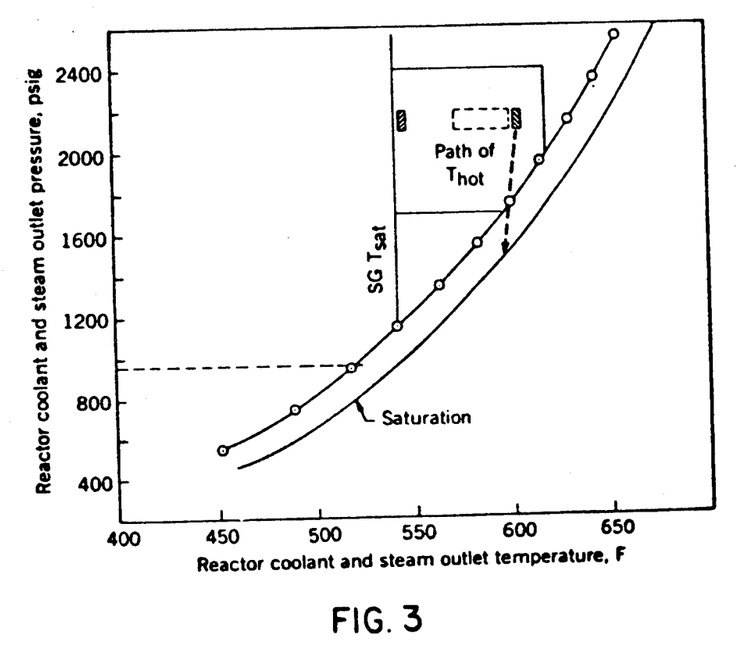
FIG. 3 illustrates the display response when an inadequate primary inventory subcooling exists.

Referring to the aforementioned symptoms, the result of an inadequate subcooling margin is illustrated in FIG. 3. In this Figure, the reactant coolant system hot leg temperature ($T_{HOT}$) drops rapidly through the subcooled margin line. This condition is typically diagnosed as a loss of adequate primary inventory subcooling, or simply "inadequate subcooling margin". In this case, the power plant operator has an established procedure to correct this condition.

Figure 4:
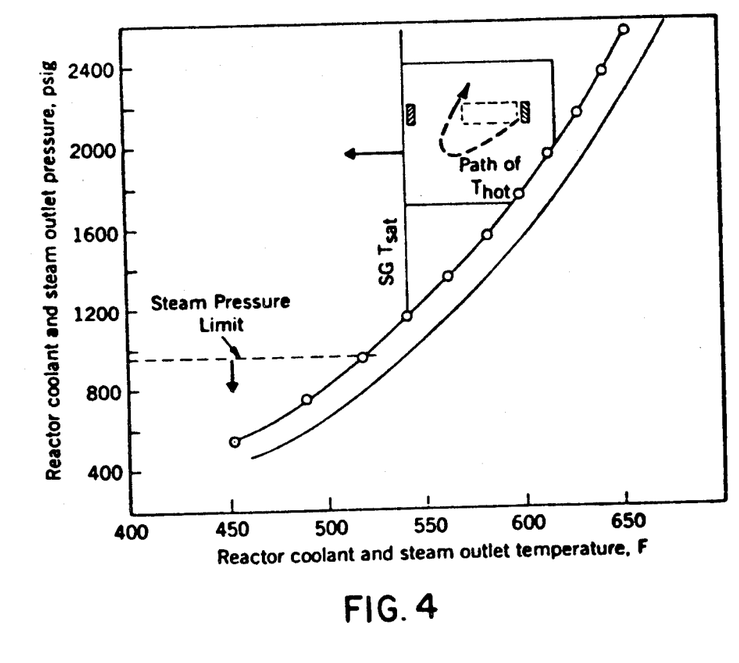
FIG. 4 illustrates the display response when an inadequate primary-to-secondary heat transfer exists.

With respect to the symptom of inadequate primary-to-secondary heat transfer, the typical display is shown in FIG. 4. In this case, the reactant coolant system hot leg temperature ($T_{HOT}$) increases as the steam generator saturation temperature (SG $T_{SAT}$) decreases. The foregoing indicates that the steam generator secondary is no longer removing heat from the coolant, and has lost coupling with the primary. As in the previously discussed symptom, this condition is diagnosed by the power plant operator and corrective measures are taken.

Figure 5:
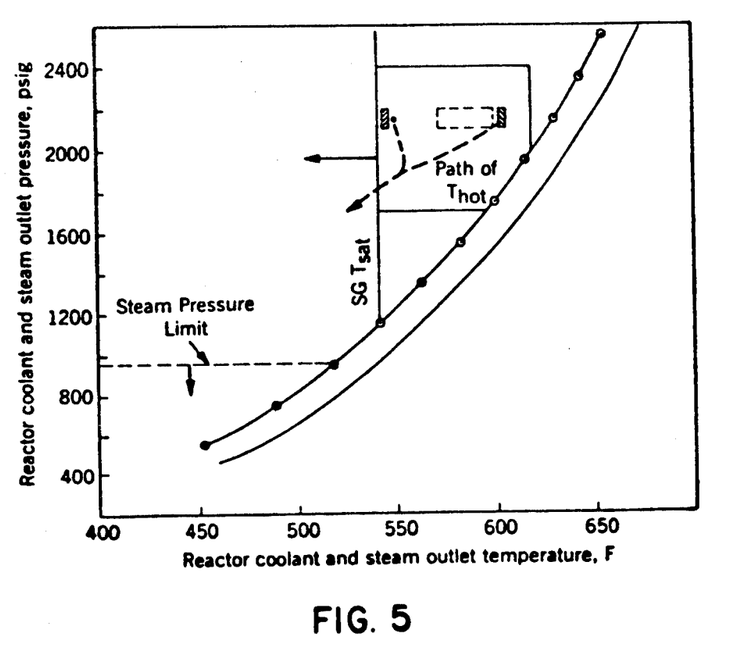
FIG. 5 illustrates the display response when an excessive primary-to-secondary heat transfer exists.

As for the symptom of excessive primary-to-secondary heat transfer, attention is directed to FIG. 5. When there is excessive heat transfer, the steam generator saturation temperature (SG $T_{SAT}$) decreases below its established limit and the reactant coolant system hot leg temperature ($T_{HOT}$) and cold leg temperature (SG $T_{COLD}$) have reached equal values but both have moved out of the "post-trip window" following the SG $T_{SAT}$. Here again, this condition is diagnosed by the power plant operator who adheres to an established procedure to remedy same.

Figure 6:
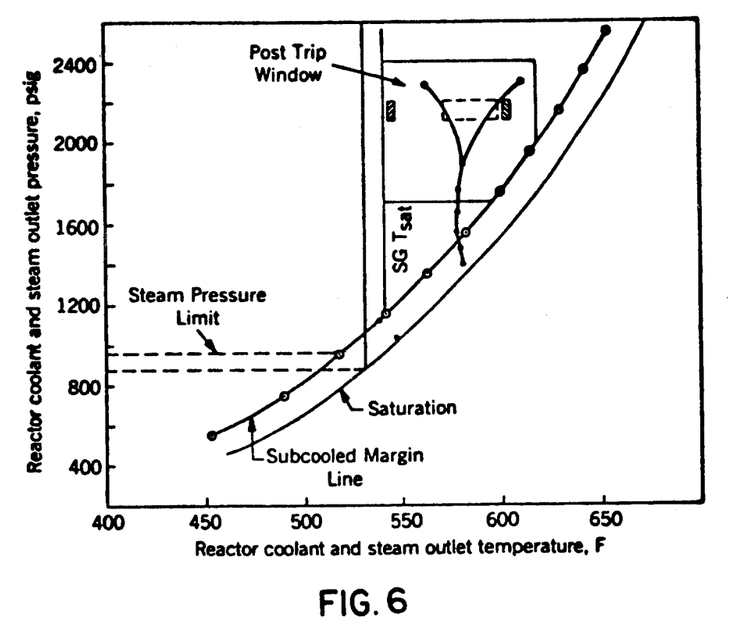
FIGS. 6 through 9 sequentially illustrate the display response after the reactor has tripped due to a loss of feedwater.

Combinations of the foregoing symptoms are also readily recognizable, as shown in FIGS. 6 through 9. For example, FIG. 6 illustrates what occurs during the first five minutes after a reactor trip caused by a loss of feedwater. After one-half minute has elapsed, the reactant coolant system hot leg temperature ($T_{HOT}$) and cold leg temperature ($T_{COLD}$) are essentially the same temperature. After two and one-half minutes have elapsed, the ESFAS pressure setpoint is reached and high pressure injection commences. After three and one-half minutes have elapsed, the subcooling margin is lost and at four and one-half minutes the operator stops the high pressure injection. By the time five minutes have elapsed, the reactor coolant system is beginning to heat up and the secondary pressure and temperature of the steam generator are below limits. At this point, the $\Delta T$ across the primary to secondary of the steam generator is approximately 50° F.

Figure 7:
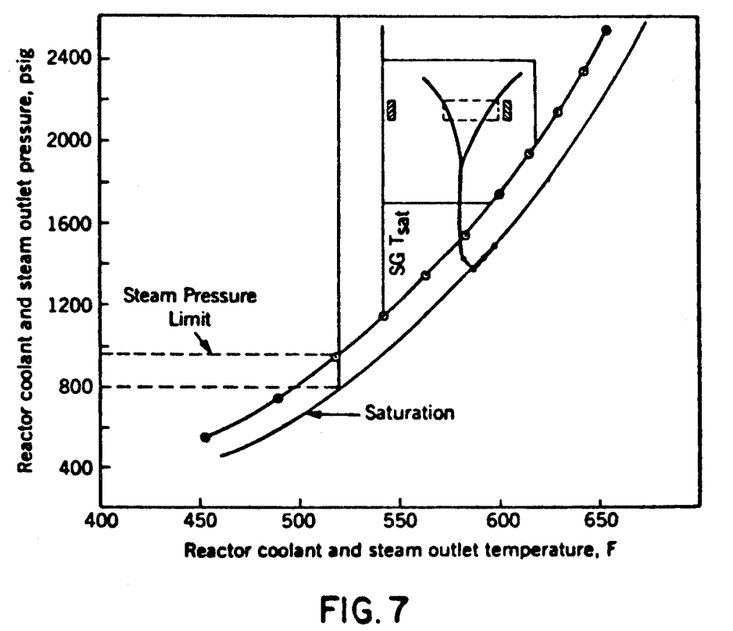

FIG. 7 illustrates what occurs during the fifth through the eighth minute after a reactor trip due to loss of feedwater. During this time period, the primary of the steam generator continues to heat up along the saturation line while the secondary pressure and temperature continue to drop. After eight minutes have elapsed, the ΔT across the primary to secondary of the steam generator is approximately 80° F. At this point, auxiliary feedwater is directed to the steam generators.

Figure 8:
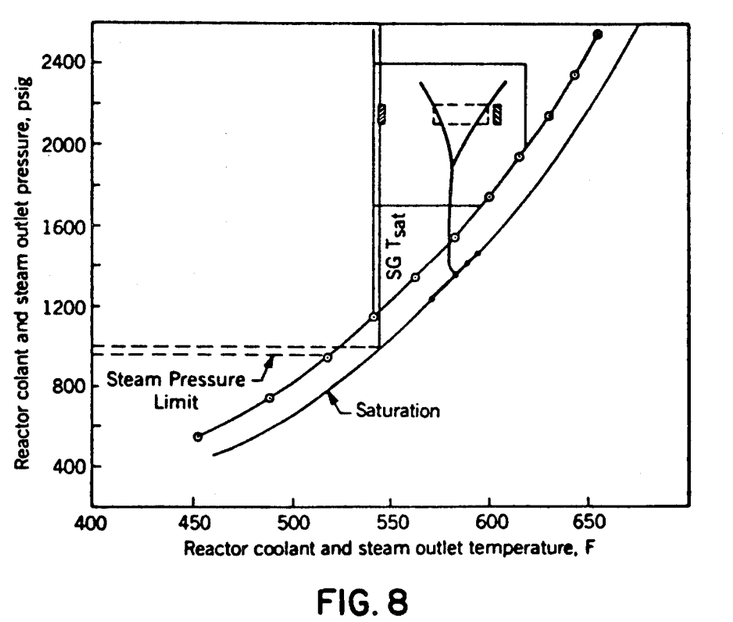

The response of the system during the eighth through the fifteenth minute after a reactor trip due to loss of feedwater is illustrated in FIG. 8. During this period, steam pressure and temperature recover to their normal post-trip values and substantial cooling of the primary of the steam generator is in progress.

Figure 9:
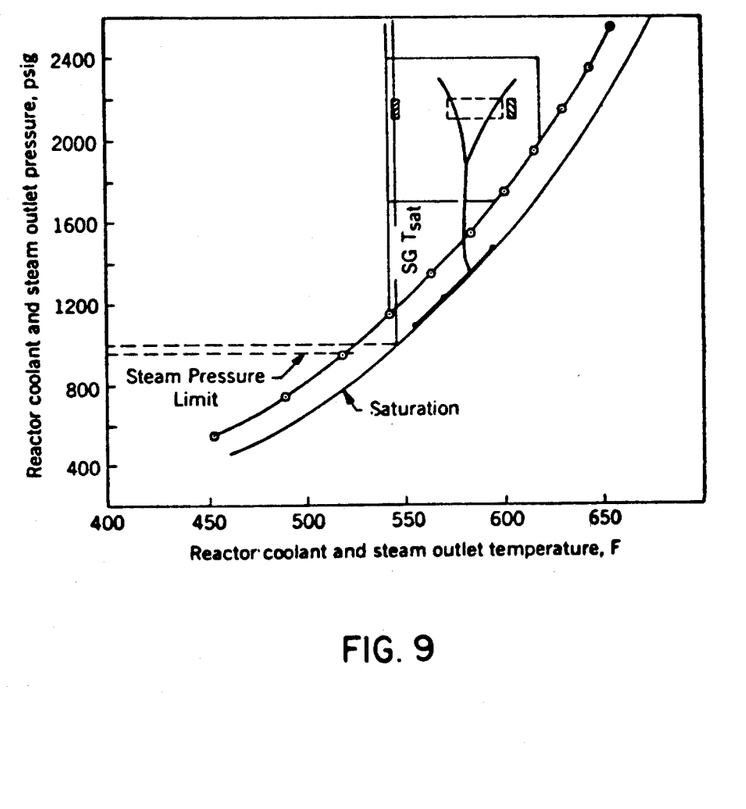

The final portion of the system response is illustrated in FIG. 9 which shows the response during the fifteenth through the twentieth minute after a reactor trip due to loss of feedwater. During this period, the primary-to-secondary heat transfer (coupling) is almost completely restored. In addition, the reactor coolant system hot leg temperature ($T_{HOT}$) and cold leg temperature ($T_{COLD}$) are approaching their normal post-trip values.

From the foregoing it is apparent that these symptoms can be combined and displayed on a cathode ray tube. With relatively few input variables, the operator can monitor the real time progression of a transient. If one display is used for each reactor coolant system loop, a continuous complete record of the entire event is possible. This record allows initial diagnosis, positive feedback on corrective actions, and early detection of subsequent malfunctions.

Figure 10:
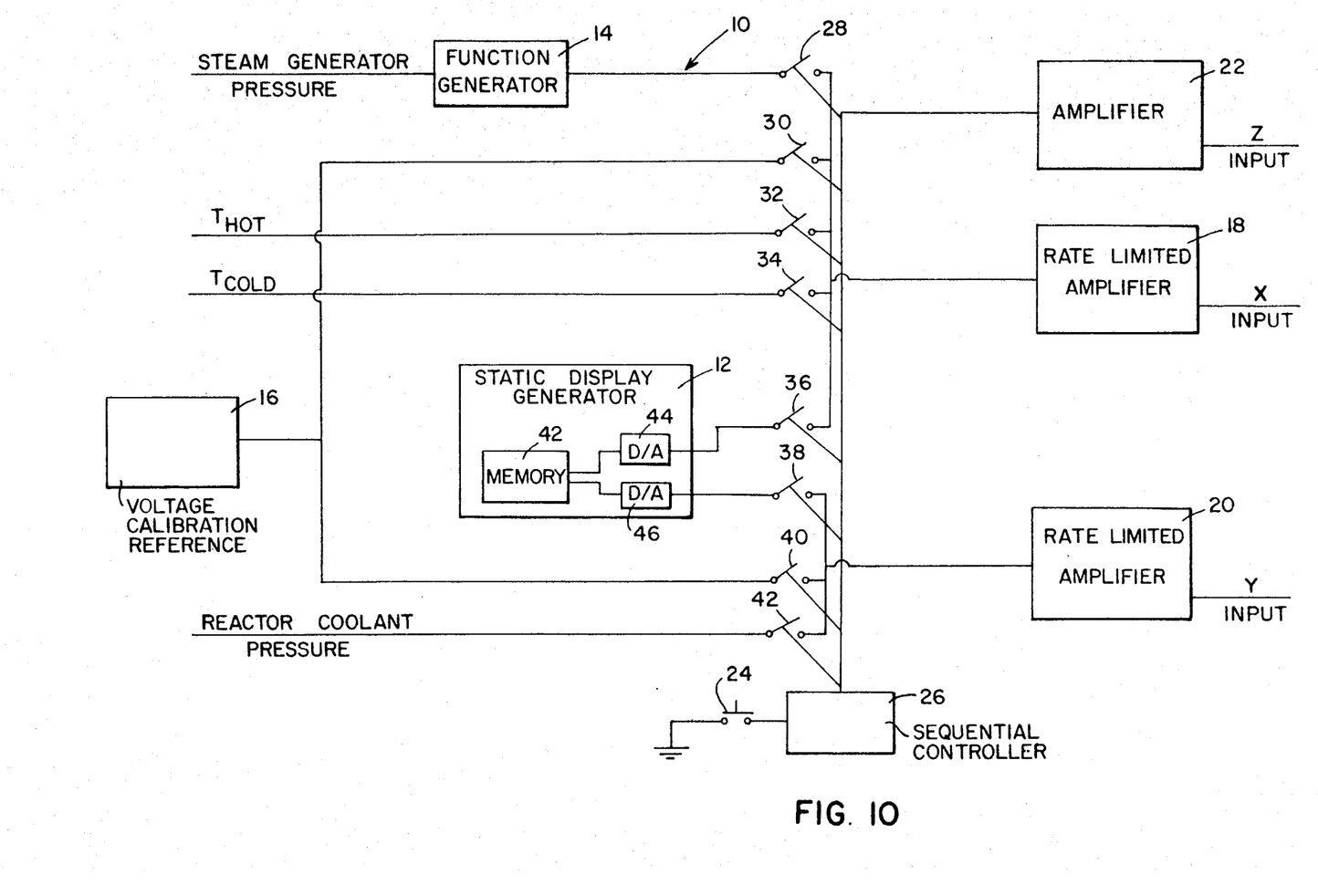
FIG. 10 is an electrical schematic of the circuitry required to implement the invention of this disclosure.

The circuitry 10 required to accomplish the foregoing is shown schematically in FIG. 10. This circuitry 10 is comprised of a static display generator 12, a function generator 14, a voltage calibration reference 16, rate limited amplifiers 18 and 20, an amplifier 22, a calibration test switch 24, a sequential controller 26, and plurality of high speed switches 28, 30, 32, 34, 36, 38 and 40.

As previously indicated, the displays illustrated in FIGS. 1 through 9 are basically pressure-temperature (P-T) displays with a saturation curve included. As such, the X-axis of the display is used for reactor coolant and steam outlet temperature whereas reactor coolant and steam outlet pressure are plotted on the Y-axis. A memory 42 is provided in the static display generator 12 for the retention of this display, the saturation curve, the subcooled margin line, the "post-trip window" and a calibration test box, hereinafter described. Digital to analog converters 44 and 46 are connected to the output of the memory 42 for the conversion of the data retained therein for the X-axis and Y-axis, respectively. The outputs of the digital to analog converters 44, 46 are connected to the inputs to the rate limited amplifiers 18 and 20, respectively via switches 36 and 38. These amplifiers 18 and 20 are contained within the display device and drive the X-axis and Y-axis, respectively of the device.

As previously stated, the X-axis of the static display illustrates reactor coolant and steam outlet temperature. Thus, the rate limited amplifier 18, which drives the X-axis, must have additional inputs in the form of steam generator pressure measurements (SG $T_{SAT}$) and reactor coolant system hot leg ($T_{HOT}$) and cold leg temperature ($T_{COLD}$) measurements. An analog signal representative of steam generator pressure is used an an input to the function generator 14 which converts same to the saturation temperature of the steam generator. This saturation temperature is transmitted to the rate limited amplifier 18 via switch 28 for display on the display device. Similarly, analog signals representative of reactor coolant system hot leg and cold leg temperatures are transmitted to the rate limited amplifier 18 via switches 32 and 34 respectively. In the foregoing manner, all the required inputs to the rate limited amplifier 18 are provided for the proper display of data along the X-axis.

In contrast, the Y-axis of the static display is concerned with reactor coolant and steam outlet pressure, and, as such, the rate limited amplifier 20, which drives the Y-axis, must have an additional input in the form of reactor coolant pressure measurements. Analog signals representative of this pressure are transmitted to the rate limited amplifier 20 via switch 42. In this manner, all of the necessary inputs to the rate limited amplifier 20 are provided for the display of data along the Y-axis.

The sequential controller 26 controls the sequential operation of switches 28, 32, 34, 36, 38 and 42 for continuous monitoring of the operation of the system, as will be hereinafter described. In this manner, the foregoing symptoms, individually and in combination, can be constantly monitored and corrective procedures initiated when required.

The voltage calibration reference 16 is connected to the inputs to the rate limited amplifiers 18 and 20 via switches 30 and 40, respectively. These switches 30, 40 are manually activated by the power plant operator and are used to calibrate the display device, as will be hereinafter described. The calibration test switch 24 is connected to the sequential controller 26 and is used to initiate calibration of the display device.

When the display is to be placed in operation, calibration is typically first undertaken. In order to calibrate the device, the calibration test switch 24 is actuated which causes a test box to be shown in the upper right hand portion of the display. Actuation of the switches 30 and 40 cause a calibration spot (an "X") to be shown on the display. If the device is in calibration, the calibration spot is within the test box. If the device is not in calibration, the calibration spot will be outside the box, and the device should be calibrated to insure accuracy.

Assuming the device is in calibration, the sequential controller 26 controls the sequential operation of the switches which is as follows:

(1) Actuate switches 36 and 38 to place static display, the saturation curve, the subcooled margin line, the "post-trip window" and the calibration test box, all of which are retained in memory 42, on the display device.

(2) Actuate switches 32 and 42 to place measurements of reactor coolant system hot leg temperature ($T_{HOT}$) versus reactor coolant pressure on the display device.

(3) Actuate switches 34 and 42 to place measurements of reactor coolant system cold leg temperature ($T_{COLD}$) versus reactor coolant pressure on the display device.

(4) Actuate switch 28 to place measurements of steam generator saturation temperature on the display device. When switching between the steps of the foregoing sequence occurs, the sequential controller blanks the output of the amplifier 22 to prevent the production of a trace during switching time. In addition, when the sequential controller 26 is in one of the foregoing sequential phases, the other phases are not involved, i.e., only those switches for that particular phase are actuated. The sequential controller 26 proceeds through the foregoing sequence very rapidly and continues to cycle through this sequence so as to continuously monitor the symptoms. It is anticipated that the cycle rate will be approximately 100 times per second and thus real time progressions of transients will be displayed. It should be noted that the display device can be a cathode ray tube with a switchable storage so that the display can show the trace of the changing operating parameters. In this manner, the actual transient condition can be recorded.

Certain modifications and improvements will occur to those skilled in the art upon reading the foregoing. It should be understood that all such modifications and improvements have been deleted herein for the sake of conciseness and readability but are properly within the scope of the following claims.

I claim:

1. An electrical circuit for sampling and displaying data on a display device comprising memory means having a static graphical display stored therein including a calibration box, means for monitoring a plurality of data inputs, and means for transferring said static graphical display to a display device, said transferring means further including means for sampling said data inputs and transferring said data to the display device for display on the graphicl display and means for calibrating said graphical display to insure the accuracy thereof including a first switch to actuate the memory means to display the calibration box on the graphical display and a second switch to actuate a calibration spot on the graphic display, said calibration spot being within the calibration box whenever the graphical display is in calibration.

2. The electrical circuit as defined in claim 1 wherein said transferring means is a plurality of switching means.

3. The electrical circuit as defined in claim 1 wherein said sampling means sequentially sample said data inputs in a continuous cyclical manner.

* * * * *